United States Patent [19]

Olofsson

[11] Patent Number: 4,631,218

[45] Date of Patent: Dec. 23, 1986

[54] WOODEN BASE PLATE

[76] Inventor: Stig Olofsson, Televerkets Industridivision, Box 1001, S-149 01 Nynäshamn, Sweden

[21] Appl. No.: 670,724

[22] Filed: Nov. 13, 1984

[30] Foreign Application Priority Data

Nov. 16, 1983 [SE] Sweden ................... 8306316

[51] Int. Cl.⁴ .................... B32B 3/10; B32B 3/02; H04M 1/05; B05D 3/02
[52] U.S. Cl. .................... 428/131; 428/137; 428/157; 428/165; 428/537.1; 179/157; 427/317
[58] Field of Search ............ 428/131, 137, 165, 157

[56] References Cited

U.S. PATENT DOCUMENTS

| Re. 3,085 | 8/1868 | Mayo | 428/106 X |
| 842,411 | 1/1907 | Messinger | 428/106 |
| 3,661,688 | 5/1972 | Wheeler | 428/156 X |
| 3,879,874 | 4/1975 | Broussard, Sr. | 428/542.4 X |

Primary Examiner—P. C. Ives
Attorney, Agent, or Firm—Pollock, Vande Sande & Priddy

[57] ABSTRACT

A base plate including an upward projecting peripheral rim and slots on the edge of the rim. The plate consists of a first, preferably flat unit made of wood and a second component connected to it and made of solid wood in the form of a composite frame consisting of three or more parts. Each part of the frame is dried to a very low moisture content and then heat-treated so that the pith fibers are sealed by resin released from the wood. The surface of each part of the frame is also treated with varnish or a similar substance which seals the surface pores of the wood. Each part of the frame is so arranged that the grain of the wood coincides essentially with the height direction of the plate. A reinforcing element prevents the warping of the wood caused by internal stresses in the wooden material.

3 Claims, 3 Drawing Figures

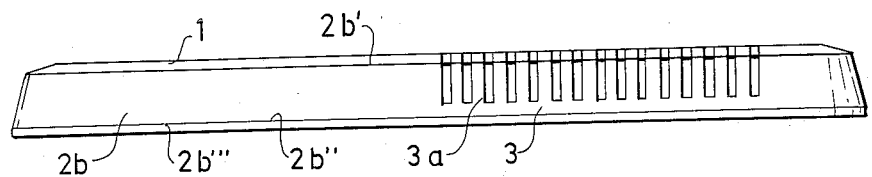
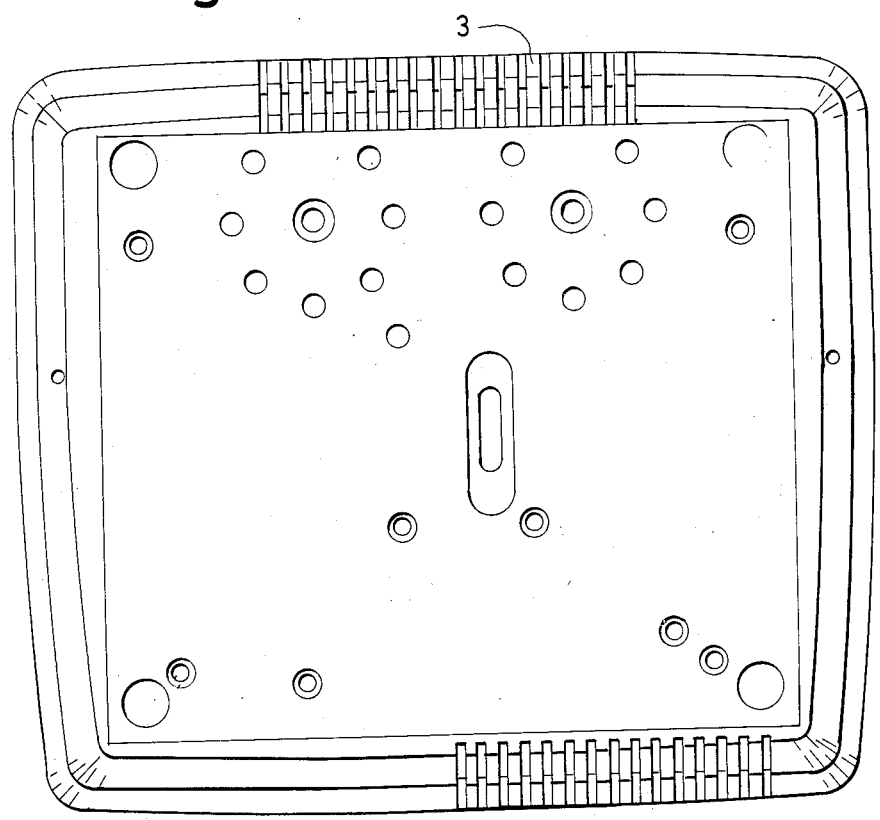

WOODEN BASE PLATE

TECHNICAL FIELD

The present invention relates to a plate intended in particular for a telephone apparatus or some other apparatus and made of wood, for example a base plate, which includes an upward projecting peripheral rim and slots standing in the rim.

DESCRIPTION OF THE PRIOR ART

The manufacture of plates of this kind in wood has been previously disclosed. In the case of telephone apparatuses, for example, there exists a wish to be able to made apparatus cases and the associated plates in wood so that, when viewed from the outside, each apparatus is able to exhibit a construction which corresponds to the construction of apparatuses made in, for example, a plastics material. Telephone apparatuses made in wooden material must be capable of being used in a conventional manner in those environments which are normally encountered by telephone apparatuses as such.

The design of telephone apparatuses or similar apparatuses in wood imposes high requirements in the manufacture of the apparatus as such. Thus, for example, the wooden telephone apparatus must be able to accommodate the same amount of telecommunications components as a conventional telephone apparatus made from a different material.

DESCRIPTION OF THE PRESENT INVENTION TECHNICAL PROBLEMS

Base plates made of wooden material are subject to high demands from the point of view of moisture and strength. The wooden material should not develop cracks or fall apart after a certain period of use. The presence of the slots, which are generally in the form of acoustic slots also impose special requirements on the apparatus from the point of view of strength.

SOLUTION

The present invention is directed to a wooden plate in which the above problems are solved. A novel wooden plate consists of a first, preferably flat unit made of in wood and a second component arranged next to it and made of solid wood in the form of a composite frame having three or more parts. Other characteristic features are that each frame part is subjected to a high degree of drying and heat treated in such a way that the pith fibres of the wood are sealed by the resin released from the wood and surface treated with varnish or a similar fluid which seals the surface pores of the wood. Other characteristic features are that each frame part is so arranged that the longitudinal direction of the wood coincides essentially with the height direction of the plate, and that there is connected to the free end edge of the frame part a reinforcing element which prevents the occurence of any warping in the wood caused by any internal stresses which may be present in the wooden material.

Further embodiments of the invention take into account the manner in which the reinforcing element is to be arranged at the aforementioned free end edge.

ADVANTAGES

According to the present invention a base plate for a telephone apparatus is provided which may be used in the normal environment without the risk that cracking and warping of the wood will occur as the result of moisture. The novel plate also makes possible a long-term use of the plate without cracking and warping problems. Since the parts which extend between the slots are arranged to coincide with the longitudinal direction of the wood, the strength of the wood can be utilized to provide a strong structure from the mechanical point of view.

The use of an extremely high degree of drying of the inside of the frame parts produces a low moisture content in the core of the wood. By sealing the pith fibres with the help of the wood's own resin, the re-absorption of moisture by the cores of the frame parts is effectively prevented. The sealing of the surface pores of the wood with varnish or a similar fluid counteracts the re-absorption of moisture. Although a small amount of moisture is re-absorbed at the surface of the frame parts, further penetration to the cores of the frame parts is prevented. Any minor stresses which may occur as the result of different moisture levels at the surface zones of the frame will gradually be balanced out.

DESCRIPTION OF THE DRAWINGS

A preferred embodiment of a plate exhibiting the significant characteristic features of the invention is described below with simulantaneous reference to the accompanying drawings, in which:

FIG. 2 shows a side view of the base plate in accordance with FIG. 1;

FIG. 3 shows the bottom of the base plate in accordance with FIGS. 1 and 2.

DESCRIPTION OF THE PREFERRED EMBODIMENT

Figure 1:
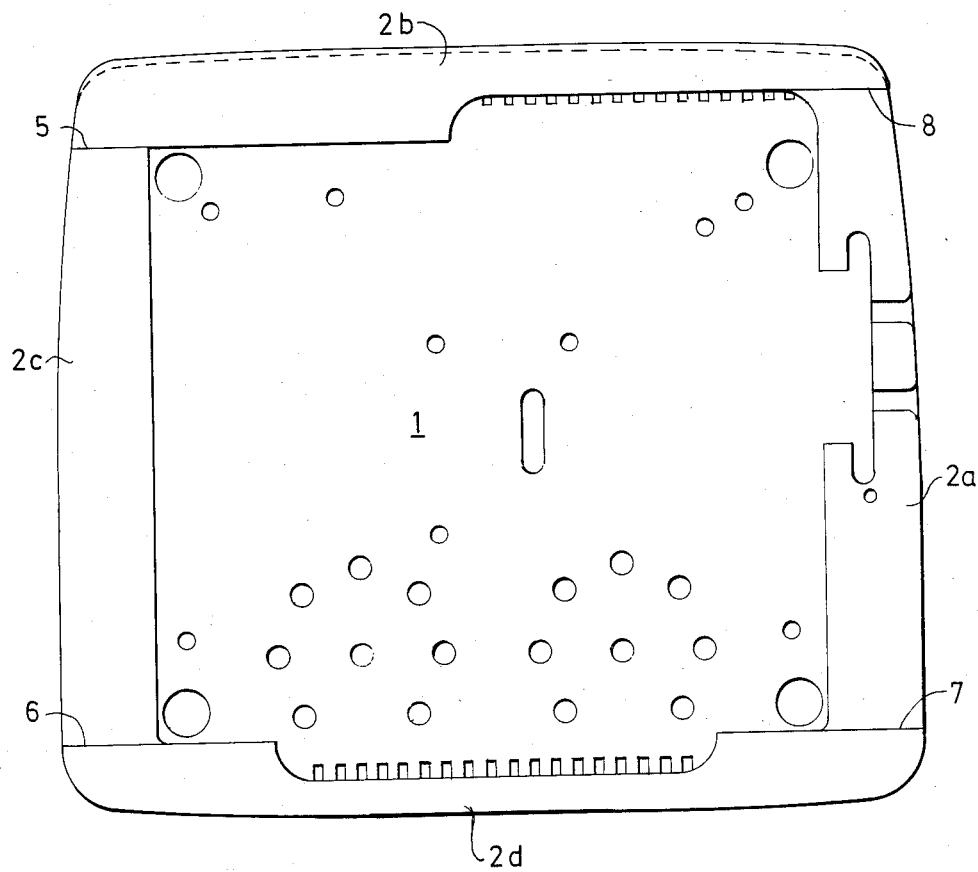
FIG. 1 shows a view seen horizontally from above of a base plate designed to form part of wooden telephone apparatus.

The design of the base plate depends upon the construction of the telephone apparatus. The design of the base plate may thus vary considerably, is known in the prior art, and therefore does not need to be described in any greater detail here. The base plate usually consists of an essentially flat unit 1 and arranged next to it a unit in the form of a frame which is composed in the present case of four frame parts 2a, 2b, 2c and 2d. The frame parts are glued by means of a known adhesive and in a previously disclosed fashion. The frame 2a-2d is also securely glued in a similar fashion to the unit 1, on which the frame forms an upward projecting peripheral rim. One or more of the aforementioned frame parts may be made with slots on the edge. In the present frame parts 2b and 2d are provided with such slots, while the remaining two frame parts do not have slots. As may be appreciated from FIG. 3, the slots may extend partly into the unit 1.

The joining lines for the frame parts are indicated in FIG. 1 by the refererence designations 5, 6, 7 and 8. The sectional area of the frame parts in relation to the unit 1 is indicated in FIG. 2 by the symbol 2b'. Other frame parts have similar sectional areas. Each frame part also includes a sectional area 2b at its free end edge. To this sectional area is applied a reinforcing element 2b forming part of each frame part. Other frame parts have a similar construction with similar reinforcing elements. The reinforcing element 2b may be made of the same type of wood as the rest of the frame parts, or of a different type of wood. The frame parts and possibly also the unit 1 are manufactured of solid wood, for example mahogany, walnut, curly-grained birch, wavy-grained birch, sycamore, cherry and/or African rosewood. The unit 1 may be manufactured in cross-laminated veneer.

A signficant feature of the invention is the fact that the frame parts undergo a process which results in an extremely low residual moisture content. The moisture content may be in the range of from about 4–5 percent by weight. Another characteristic is that, at the end of the drying period, the resin is caused to flow from the wood to seal the pith fibres, and break down the hemicellulose in the wood. The surface pores of the frame parts are also sealed with varnish or a similar fluid to prevent the re-absorption of moisture by the wood. A further major characteristic feature is that the wood in the frame parts has been selected in such a way that the direction of the grain of the wood or its longitudinal direction coincides with the height direction of the plate. The parts 3a between the slots 3 thus coincide with the longitudinal direction of the wood, thereby guaranteeing maximum strength. Parts 3a may be reinforced, if necessary, on the inside, for example by means of cross-laminated veneer.

The degree of drying of the frame parts and possibly also the unit 1 can be achieved in a previously disclosed fashion by means of vacuum drying. The drying process commences with a long heating-up period at a first temperature, for example 50° C. Once the timber or the plank from which the frame parts have been taken has been thoroughly heated through all the way to the core, the timber or plank is subjected to a vacuum for a comparatively short time. The remainder of the drying process consists of successively heating and exposing to vacuum in order to achieve the desired driving off of the moisture. At the end of the drying period the temperature is increased to 65° C., at which the outflow of the resin and the breaking down of the hemicellulose will take place. The blanks are then cut from the dried plank and are worked into their final form. A certain amount of moisture may be re-absorbed at the surface of the timber during the working process. Any moisture which is re-absorbed will, however, remain at the surface of the timber, and any resulting internal stresses in the wood will gradually even themselves out.

It will be appreciated from the above that the form of the base plate has no real significance for the invention as such, and that the aforementioned form may thus vary within wide limits.

The invention is not restricted to the embodiment described above by the way of example, but may undergo modifications within the context of the following Patent Claims and the idea of invention.

I claim:

1. A plate, for an apparatus made of wood, said plate having an upwardly projecting peripheral rim and slots located on the edge of said rim, wherein said plate comprises a first, flat component made of wood and a second component connected to said flat component to form said upwardly projecting rim, said second component made of solid wood and comprising a composite frame having at least three parts, wherein a plank of solid wood from which each of the frame parts has been made has first been subjected to drying to a moisture content of about 4 to 5% and has then been heat-treated whereby pith fibers of the wood are sealed by resin released from said wood and is further surface treated with varnish for sealing the surface pores of the wood, and wherein each part of said frame is so arranged that the grain of the wood coincides essentially with the height direction of the plate, and wherein said plate further comprises a reinforcing element next to the free end edge of said frame part for preventing warping in the wood caused by internal stresses.

2. A plate according to claim 1, wherein said reinforcing element covers at least part of said end edge.

3. A plate according to claim 1 or 2, wherein said frame parts are joined to each other and are connected to said unit by means of an adhesive.

* * * * *